United States Patent [19]

Marsh

[11] Patent Number: 5,621,434
[45] Date of Patent: Apr. 15, 1997

[54] CURSOR MANIPULATION SYSTEM AND METHOD

[75] Inventor: Donald M. Marsh, Mountain View, Calif.

[73] Assignee: Object Technology Licensing Corp., Cupertino, Calif.

[21] Appl. No.: 104,748

[22] Filed: Aug. 11, 1993

[51] Int. Cl.$^6$ .................................................. G09G 5/04
[52] U.S. Cl. ........................................ 345/145; 395/326
[58] Field of Search ................................. 345/145, 146, 345/157; 364/518; 395/156, 155, 157, 158, 159, 160

[56] References Cited

U.S. PATENT DOCUMENTS

| | | | |
|---|---|---|---|
| 4,723,209 | 2/1988 | Hernandez et al. | 364/518 |
| 4,821,220 | 4/1989 | Duisberg | 364/578 |
| 4,847,605 | 7/1989 | Callahan et al. | |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1992 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,146,211 | 9/1992 | Adams et al. | 345/145 |
| 5,146,212 | 9/1992 | Venolia | 345/145 |
| 5,151,987 | 9/1992 | Abraham et al. | 395/575 |
| 5,157,768 | 10/1992 | Hoeber et al. | 345/145 |
| 5,161,212 | 11/1992 | Littleton | 345/145 |
| 5,181,162 | 1/1993 | Smith et al. | 364/419 |
| 5,202,981 | 4/1993 | Shackelford | 395/600 |
| 5,261,054 | 11/1993 | Lerner et al. | 345/163 |

OTHER PUBLICATIONS

James L. Conger, "The Waite's Groups Windows API Bible," pp. 1–11 and 163–190; (1992), Waite Group Press.
*Commodore 64C System Guide Learning to Program in Basic 2.0,* Commodore Electronics Limited (Apr. 1986) pp. 57–58, 67–75.
*Object Oriented Programming Featuring Actor,* Marty Franz (1990) Scott, Foresman and Company; pp. 3–10.
*Intelligent Offices Object–Oriented Multi–Media Information Management in Client/Server Architectures,* Khoshafian et al. ( ) pp. 102–103; 124–127; 158–159; 206–209; 214–217; 238–259.
IBM Technical Disclosure Bulletin, V.33(6B), Nov. 1990, New York, US, pp. 271–273 "Abstraction of Mouse/Keyboard User Input Mechanisms".
IBM Technical Disclosure Bulletin, V.26(4), Sep. 1983, New York, US, pp. 2154–2155, "Direct Extraction of Cursor Location From a Display".

*Primary Examiner*—Richard Hjerpe
*Assistant Examiner*—Kara Farnandez Stoll
*Attorney, Agent, or Firm*—Bookstein & Kudirka

[57] ABSTRACT

A cursor manipulation system and method provides for interrogation of the most recently displayed cursor location upon the occurrence of a user-generated event, such as actuation of a mouse button, to avoid errors of input to an application due to delays in rendering of cursor images. The coordinates of a displayed cursor location are stored as an acknowledgment of completion of display of a cursor image at a new location. Specification of cursor display location is determined by a graphic input device corresponding to each cursor image and applications running on a data processing system including the cursor manipulation system are isolated from control of cursor movement.

10 Claims, 7 Drawing Sheets

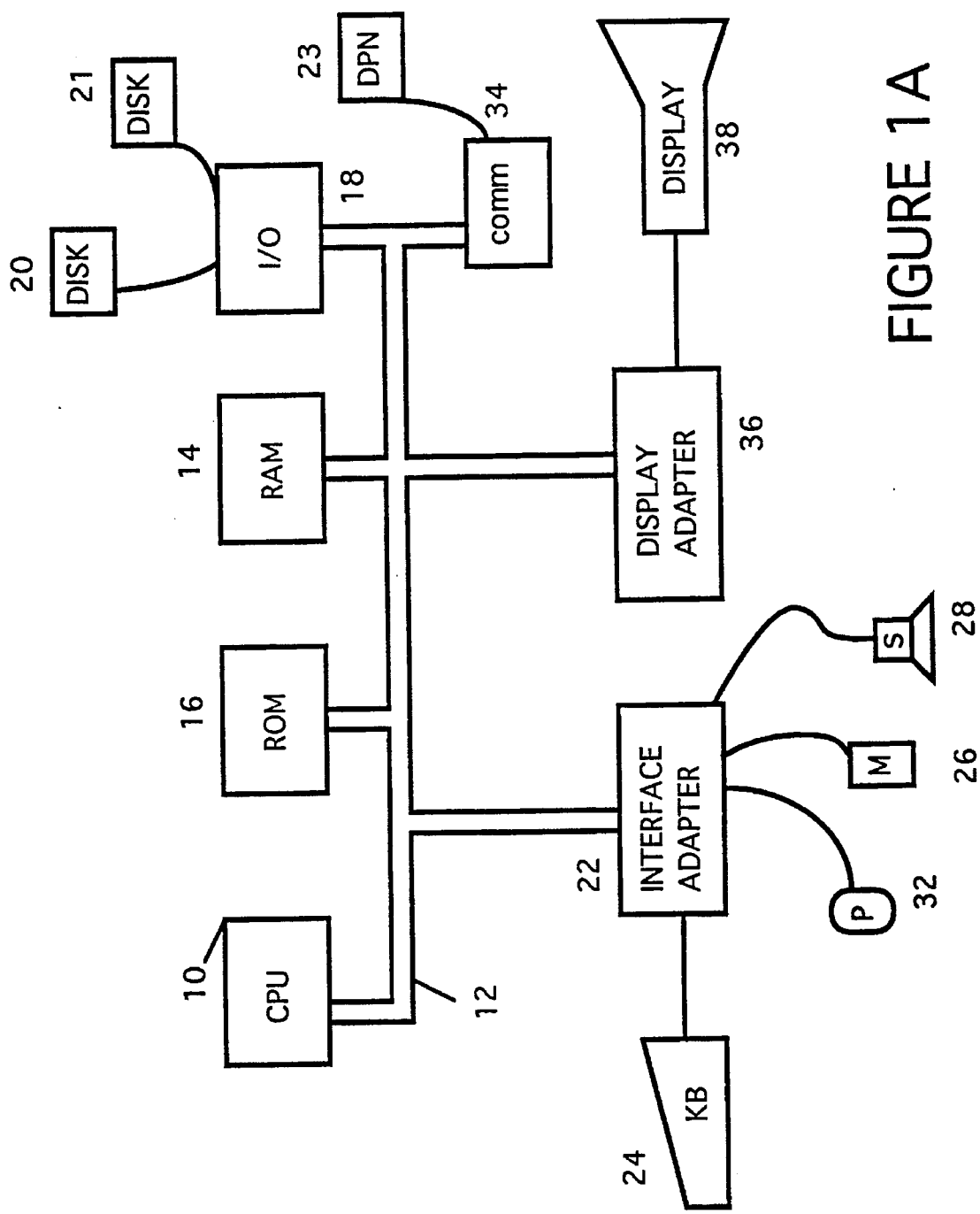

CURSOR MANIPULATION SYSTEM AND METHOD

CROSS-REFERENCE TO RELATED PATENT APPLICATIONS

This application is related to the pending U.S. patent application entitled "DISPLAY COMPOSITING SYSTEM," by Jeff Zias, et al., filed Jul. 9, 1993, Ser. No. 08/089,924, now U.S. Pat. No. 5,487,145, and assigned to Taligent, Inc., the disclosure of which is hereby incorporated by reference.

BACKGROUND OF THE INVENTION

1. Field of the Invention

The present invention generally relates to data processing systems using graphical input devices and displayed cursors as part of the user interface and, more particularly, to the interaction of cursors and the data processing system and applications running thereon for data input from a graphical input device.

2. Description of the Prior Art

Graphical input devices such as a mouse, light pen, track ball and data glove are familiar to users of data processing systems. Providing for movement of a displayed cursor to follow movements of such graphic input devices is also well-understood in the art. Graphic input devices are also provided with a selection input, such as a button which can be actuated to perform a predetermined function in accordance with an application program and the position specified by the graphic input device. Different types of actuation (e.g. click, double click, press and hold, etc., collectively referred to as "events") may be differentially detected to perform different functions. These features allow for selection, dragging, menu manipulation, graphical drawing and many other operations to be performed at high speed and with great efficiency of user interaction.

In general, movement of a graphic input device causes generation of a signal, usually in the form of a pulse train which is input to a counter or register which maintains the current cursor position. For simplification of the displayed image, particularly in multi-tasking environments where many different cursors may be provided, cursor images may be toggled on and off by different operator actions as may be provided in respective applications which may be run on the data processing system. For example, display of the cursor image may be initiated by movement of a particular graphic input device corresponding to the cursor and terminated by any other input, such as a keystroke on a keyboard.

However, display generation is a computationally intensive process and data processing systems operate at a finite speed. Usually, display generation must be done using the same processor (e.g. CPU) on which one or more applications are currently running and the application must be interrupted in order to update the display. In most cases this is preferable to other available alternatives in order to avoid inter-process calls which are time-consuming. Therefore, as displays and applications have become more sophisticated and complex, the amount of time consumed by display generation has increased. Nevertheless, display generation cannot generally be given priority over other tasks commanded by a running application.

For displayed objects which must move at high speed, the image of the object must be continually erased and redrawn. Compositing with other displayed objects may also be required. Therefore there will be a finite delay between the movement of a graphic input device and the display of a cursor image at a corresponding position on the display. This may cause overshoot of the cursor when it is manipulated. However, this possible overshoot is generally not a severe problem except when the processor is executing other commands which require a long sequence of operations, such as in controlling a printer to produce a document where character codes must be translated to a bit map for every page. In this latter case, the application cannot conveniently allow for numerous interrupts for redrawing the display. Therefore, cursor image generation and the acceptance of selection inputs from a graphic input device often is inconveniently delayed.

More recently, however, modern processors have allowed for concurrent processing of many tasks. This has permitted a general increase in the responsiveness of displays, even in multi-tasking environments. Interruption of acceptance of inputs from graphic input devices has also been reduced. Nevertheless, the complexity of display screens and the time required for rendering and compositing of displayed object images has increased the possibility of significant lag of displayed cursor position behind the position specified by a graphic input device. Moreover, the concurrent processing of tasks has created the possibility that a user may enter erroneous information with a graphic input device.

For example, assume that a display device is displaying a desktop, window or view (e.g. a window containing graphic tool menus or devices) containing a plurality of icons. As a cursor image is moved rapidly across the window or screen, it may strike such an icon and require compositing therewith, for example, if the cursor is translucent or transparent. Since compositing is a time consuming process, cursor movement may be delayed until compositing has been completed and the composited cursor image displayed and the lag between the displayed cursor position and the location specified by the graphic input device will increase in an unpredictable fashion. Other processing may also cause the same effect.

If the icon struck by the cursor is the one which the user wishes to select, the user may actuate the selector (e.g. mouse button) of the graphic input device while the cursor is displayed at the icon location. However, the location specified by the graphic input device is very likely to be a location which is different from that indicated by the cursor and selection is likely to fail. For other cursor functions such as drawing or dragging, erroneous data could be input. Therefore it can be readily appreciated that such discrepancies between the position specified by a graphic input device and a displayed cursor image can seriously degrade the ergonomics of both the data processing system and applications run thereon and present a serious inconvenience to a user.

SUMMARY OF THE INVENTION

It is therefore an object of the present invention to provide for improved association between the location of a cursor image and the functionality which can be achieved by the cursor.

In order to achieve the above and other objects of the invention, a cursor manipulation method is provided comprising the steps of altering a displayed location of a cursor in response to movement of a graphic input device and storing the displayed location of the cursor upon completion of display of the cursor at the altered location from which the last displayed location of the cursor may be retrieved.

In accordance with another aspect of the invention, a cursor manipulation system is provided including an arrangement for displaying a cursor image on a display device in accordance with an application and movement of a graphic input device, and an arrangement for isolating control of cursor movement from control by an application.

In accordance with another aspect of the invention, a cursor manipulation system is provided including an input device for specifying a new cursor location at a location on a display, a display generator for displaying a cursor image at a new cursor location and acknowledging completion of display of said cursor image at said new cursor location, and a memory for storing said new cursor location in substitution for a previous displayed cursor location in response to an acknowledgment of completion of display of the cursor at a new location.

BRIEF DESCRIPTION OF THE DRAWINGS

The foregoing and other objects, aspects and advantages will be better understood from the following detailed description of a preferred embodiment of the invention with reference to the drawings, in which:

FIG. 1A, which illustrates a typical hardware configuration of a computer in accordance with a preferred embodiment;

DETAILED DESCRIPTION OF A PREFERRED EMBODIMENT OF THE INVENTION

Figure 1B:
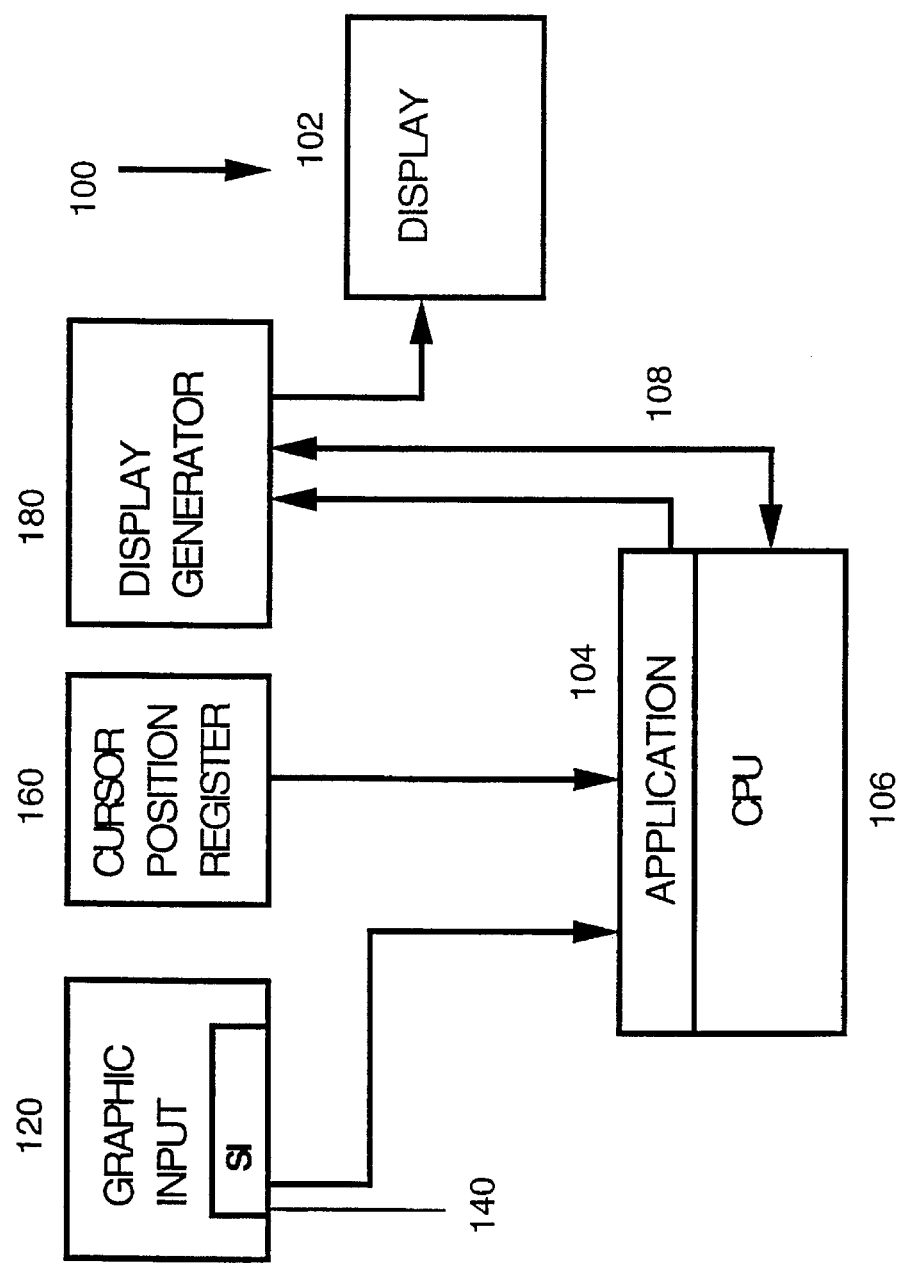
FIG. 1B is a schematic representation of a cursor arrangement.

The invention is preferably practiced in the context of an operating system resident on a personal computer such as the IBM®PS/2® or Apple® Macintosh® computer. A representative hardware environment is depicted in FIG. 1A, which illustrates a typical hardware configuration of a computer in accordance with a preferred embodiment, central processing unit 10, such as a conventional microprocessor, and a number of other units interconnected via a system bus 12. The workstation shown in FIG. 1A includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon an operating system such as the Apple System/7® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, *Reusing Object-Oriented Designs*, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations who have acquired expertise in vertical markets such as manufacturing, accounting, or bio-technology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on what level of the system you are concerned with and what kind of problem you are trying to solve. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NEXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls-the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using systems framework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

A preferred embodiment takes the concept of frameworks and applies it throughout the entire system. For the commercial or corporate developer, systems integrator, or OEM, this means all the advantages that have been illustrated for a framework such as MacApp can be leveraged not only at the application level for such things as text and user interfaces, but also at the system level, for services such as graphics, multi-media, file systems, I/O, testing, etc. Application creation in the architecture of a preferred embodiment will essentially be like writing domain-specific puzzle pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. It is important to an appreciation of the nature of the invention to understand the concept of a "framework" and the relationship of a framework to "objects" and "object-oriented programming". "MacApp: An Application Framework" by Kurt A. Schmucker, published in Byte magazine in August 1986 is an early article describing a framework and the basic concepts embodied therein, which is hereby fully incorporated by reference. An important property of objects is their ability to encapsulate data and methods for which the object is responsible. That is, a generic command may be issued to an object without the need for any other object to know the internal details of how the object will carry out the command. By the same token, there is no need for global compatibility of commands, data, file names and the like and thus objects may be freely associated with one another. A framework is, in essence, a generic application comprising an association of classes of objects with which other objects may be associated, as necessary, to form a more specific application. The framework, as an association of classes of objects with functional interrelationships between classes of objects defined therein may provide any desired degree of general or specific functionality of additional objects which may be associated with the framework.

A framework may thus be regarded as a system which provides an implied network of responsibilities between objects, provides for inheritance between classes of objects (e.g. data and methods of superclasses at higher hierarchical levels of classes of objects), and provides for calling of libraries in response to events. A system formed as a framework may also be customized by the addition of objects which perform more specific functions and which may also override functions provided by the framework. Machine-specific and device-specific objects in various classes and subclasses of the framework allow the framework, itself, to be machine- and device-independent and of generalized applicability. Further, a particular framework is characterized by the interrelationships it establishes between objects and classes of objects in terms of division of responsibilities and inheritance and the functionality it thus achieves. A framework, itself, is also useful as a template for the development of specific applications in which customization and functional overrides may be provided as specific objects therein.

A cursor model, in accordance with a preferred embodiment, is based on object-oriented programming principles. The general concepts of object-oriented programming are briefly described above and are believed to be known and will not be described in detail here. Very generally, data is abstracted and encapsulated, with objects representing or containing graphic object information being represented by varying data formats without changing the overall architecture. The interfaces to the object remain constant, with the objects themselves being abstract and independent.

The class or object in object-oriented programming design encapsulates structure (e.g., data) and behavior (e.g., so-called "method functions") which operate on the structure. In object-oriented design, an interface is an outside view of a class or object while hiding the structure and behavior of the class or object. Additionally, all objects descending from a base class inherit the properties of the base class and thus will have the same properties thereof and are polymorphic with respect to base class operations. Hence, objects descending from the base class can be used to represent an instance of the base class and can be substituted whenever a base class is called.

FIG. 1B illustrates, in schematic form, a cursor control arrangement 100 over which the present invention is an improvement. In known cursor control arrangements, a graphic input device 120 (e.g. a mouse) having a selection input 140 (e.g. a mouse button) outputs signals representing any change in position to a cursor position register 160, often in the form of a counter which accumulates the cursor position in both coordinate directions. This information is output a display generator 180 which renders the cursor image data in accordance with an application 104 running on CPU 106. The application 104 also controls rendering of much of the remainder of the display. The cursor image data is then used to control the formation of a cursor image on display 102 such as a cathode ray tube or a liquid crystal matrix.

When a user-generated selection "event" occurs, such as when a selection input 140 is actuated, a signal representing that actuation is sent to the application. At about the same time, the information in the cursor position register is sent to and/or accepted by the application as an input. (The cause and effect relationship is relatively unimportant. In fact, the application may continuously receive cursor position information and respond to that information, for example, by alteration of cursor shape in certain regions of the display or window, even in the absence of an "event".)

A problem arises from delays which may occur between the cursor position register 160 and the display 102, particularly when CPU 106 performs or controls a portion of the display generation process. To change the location of the displayed image of the cursor, the renderer must at least gain control (e.g. acquire an exclusive lock) of both the old and new locations in frame memory corresponding to the old and new cursor screen locations to erase the old cursor image and render the new image at the altered location. Therefore, granting of the lock may be delayed by, for example, drawing operations in either of these two areas. Further, once exclusive access has been acquired, a time slot must be scheduled for rendering in synchronism with the display scan in order to avoid tearing effects in the displayed image. Compositing may also require additional time for completion of the rendering process. In other words, the user may see the cursor image on the display 102 at a location other than that specified by the data in cursor position register 160. Conversely, the completion of the display at the position specified by the graphic input device cannot be guaranteed within any particular bounded amount of time.

Figure 2:
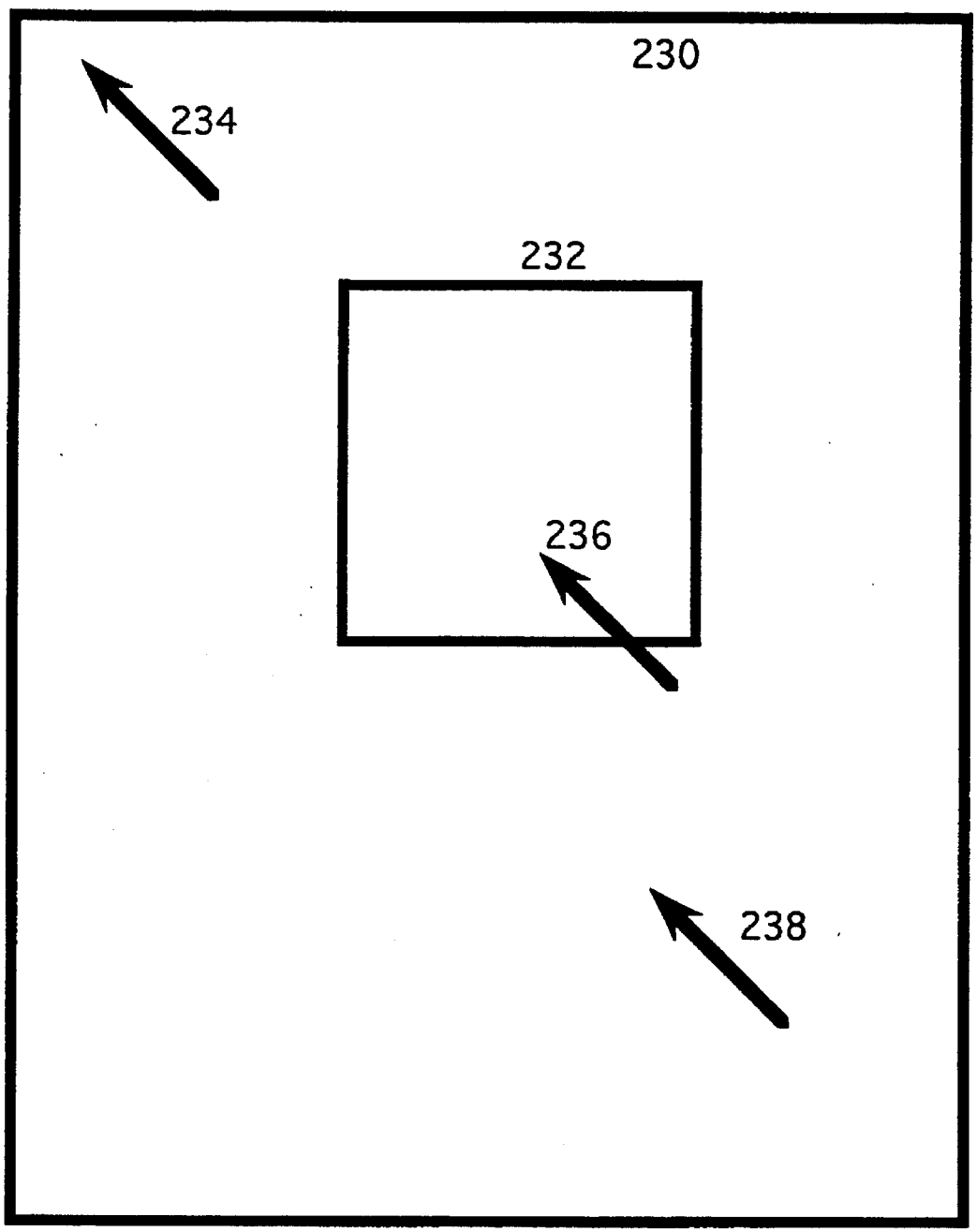
FIG. 2 illustrates a display at the time of a cursor "event" as produced by the arrangement of FIG. 1 in accordance with a preferred embodiment.

This difficulty is illustrated in FIG. 2, in which a user is seeking to move the cursor rapidly from position 234 to position 236 in order to perform an operation such as line drawing or selection, dragging or Rubberbanding of object 232. In practice, the user will most often overshoot the desired final cursor location because of slight delay in the rendering or display process, particularly if a delay occurs due to compositing or other processing when the cursor reaches displayed object 232. If such overshoot occurs in the arrangement of FIG. 1B, the position information in register 160 will reflect position 238 rather than 236. If selection (e.g. an "event") occurs at this time selection will either fail or be incorrect, particularly if another object is present at the overshoot location 238.

Figure 3:
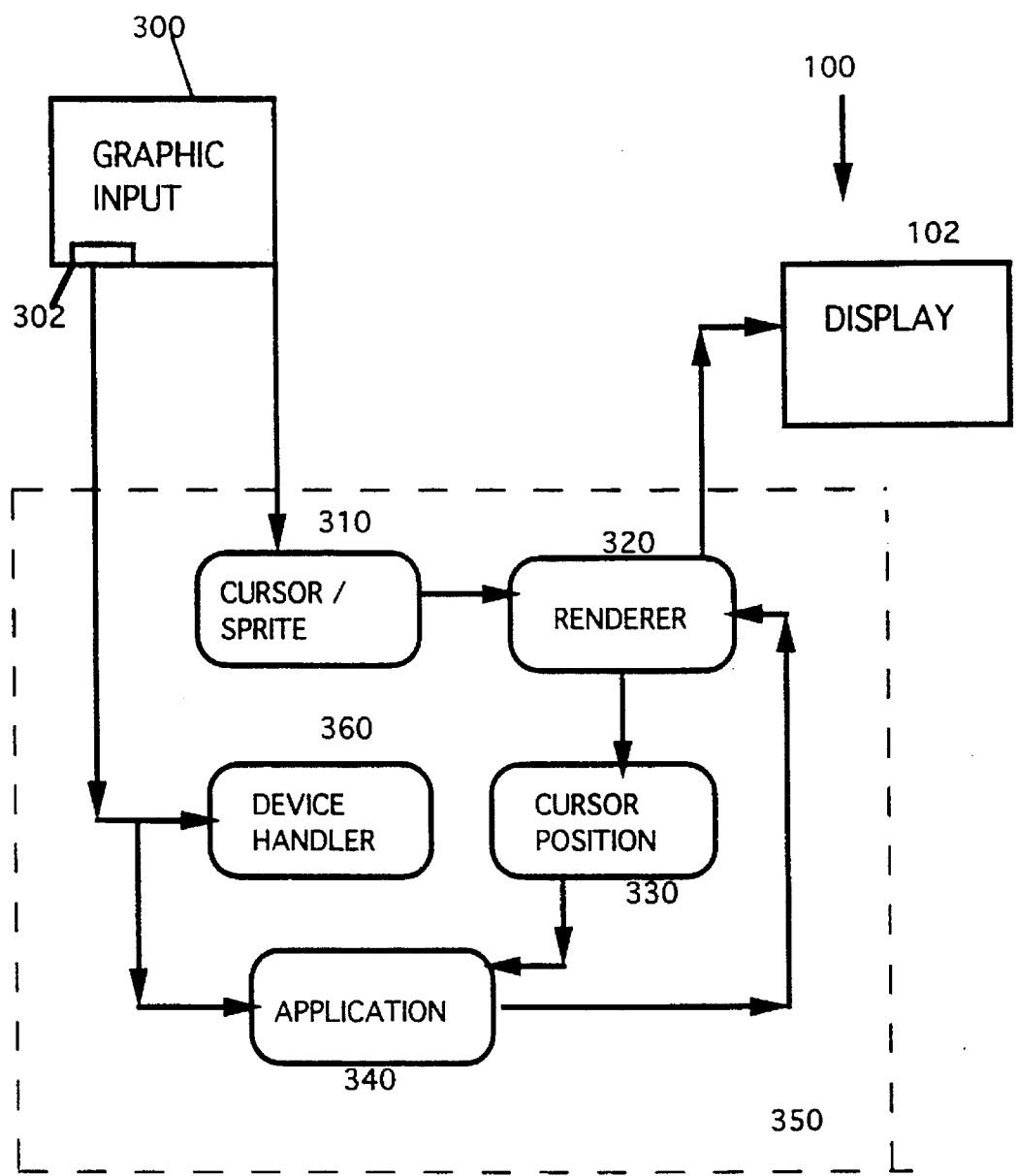
FIG. 3 is an overview of the functional organization in accordance with a preferred embodiment.

To avoid this problem, the invention, as depicted in FIG. 3, provides for interrogation of the actual displayed position of the cursor upon detection of an "event". It is to be understood that the invention is preferably implemented in what has come to be referred to as object technology in which functional portions thereof are provided as "objects" which are emulated by software. Therefore, the functional blocks of FIG. 3 are illustrated by oval-shaped "clouds" within the CPU to indicate objects or classes of objects which are emulated thereby, preferably as part of the operating system, and which serve the functional purposes indicated.

Specifically, as shown in FIG. 3, one or more applications 340 running on CPU 350 controls the major portion of the images formed on the display or window thereof in the normal manner. Graphic input device 120, including selection input 140, also communicates with the CPU 350 in the normal manner. Cursor graphics and position, including sprite graphics or animation if used to implement the cursor, are provided by a cursor object 310. This graphic and positional information is supplied to renderer 320. This is in direct distinction with the known arrangement of FIG. 1B in which the cursor position was supplied to the application which, in turn, generated the cursor graphics. It is to be understood that such information can still be supplied to the application for other purposes such as toggling visibility of the cursor or altering the graphic displayed at the cursor location, but is unnecessary for purposes of the present invention in its most general form. It is preferred in accordance with the present invention that the application is not permitted to move the cursor, even under control of a graphic input device or change the ordering of cursor priority (e.g. when multiple cursors are provided by an application or in a multi-tasking environment).

Renderer 320 is responsible for generation of the image value data which will be used to form the image on the display by specifying image values directly or by specifying addresses in a color look up table (CLUT) which specifies the image value data. The renderer therefore will always contain or have access to the information reflecting where the cursor is desired to be displayed under control of the graphic input device 120 and will also know when the display of the cursor image at that location (e.g. the rendering) has been completed. Therefore, in accordance with the invention, an additional object 330, preferably shared memory, is provided to receive the address of the currently displayed cursor position as an acknowledgment of the completion of rendering of the cursor image after each position change. Thus, when an "event" is generated by user actuation of selection input 140 of the graphic input device 120, a signal is provided to the application (e.g. to determine the nature of the event) and to the cursor position object 330, preferably through an input device handler object 360, to interrogate it for the last displayed location of the cursor image. This displayed cursor location information is then supplied to the application as a location input. In this way, the invention provides input to the application which corresponds exactly to the display, regardless of the amount of overshoot or the presence of other objects at that location or the amount of time which might elapse before the cursor is displayed at the location corresponding to the current location of the graphic input device.

The above description of the generalized implementation and concepts of the invention will enable those skilled in the art to practice the invention in its preferred form or in hardware embodiments of the objects which are preferably emulated. A detailed implementation will now be described with reference to FIGS. 4 and 5.

Figure 4:
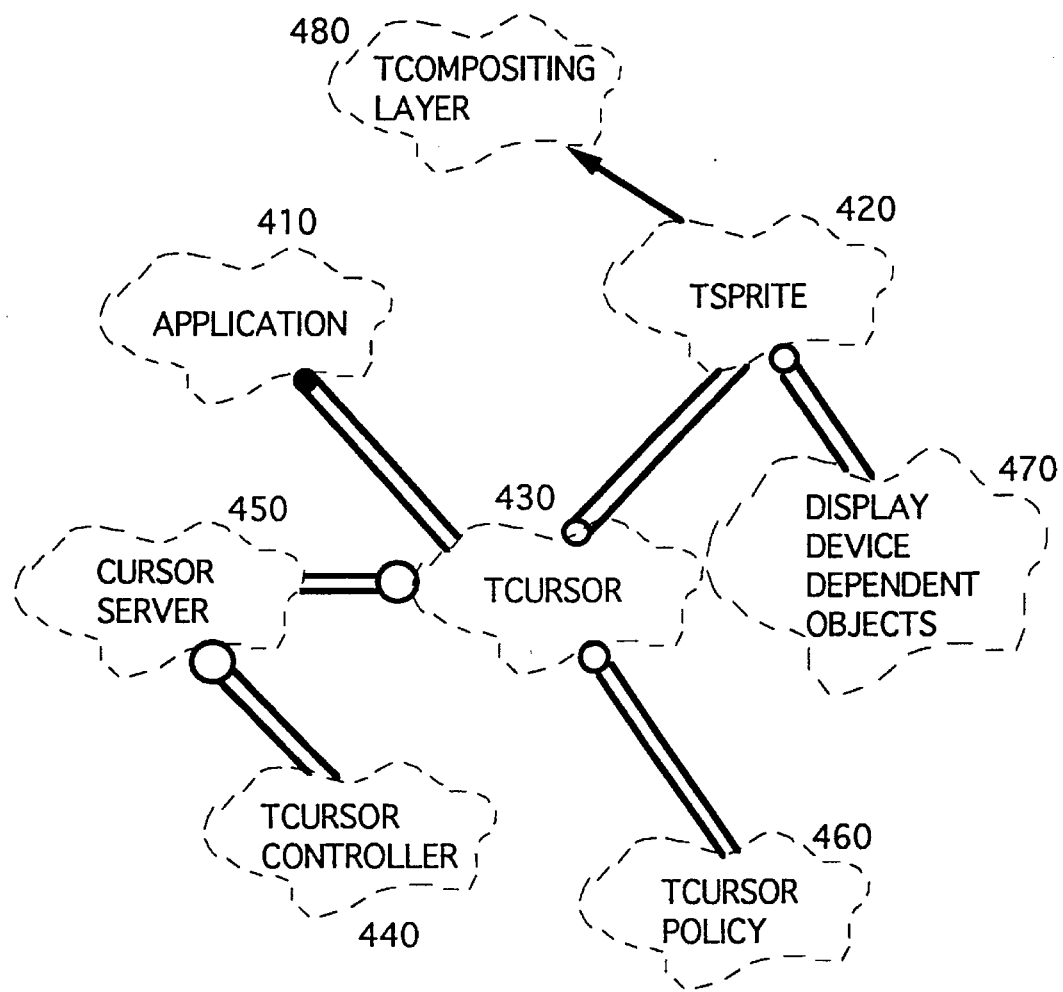
FIG. 4 is a Booch diagram in accordance with a preferred embodiment.

In the Booch diagram of FIG. 4, "clouds" depicted with dashed lines indicate classes or aggregations of classes (e.g. application 410). Arrows connecting classes are directed from subclass to superclass and indicate a hierarchy including the properties of encapsulation, inheritance and polymorphism as is well understood in object technology and graphic notations accepted in the art which are illustrative thereof. Double lines indicate use of the class in the implementation or interface. A circle at one end of a line segment indicates containment or use in the class with the circle on the end of the line segment. For a more complete description of this notation, reference is made to "Object Oriented Design" by Grady Booch, published by the Benjamin/Cummings Publishing Co., Copyright 1991.

The TCursor class 430 uses a member of the TSprite class 420 to display itself but is not directly subclassed from the TSprite class. It is also preferable that the TCursor class exist as part of the operating system, independent of the application, such that the application may control the sprite associated with each cursor it supports and control the visibility of the sprite, but not control the movement of the cursor/sprite or its compositing depth. An input device handler controls the position of the cursor using a TCursorController object 440. TCursor and TCursorController reference a surrogate object owned by the Cursor Server 450. This feature of the architecture in accordance with a preferred embodiment also allows plural cursors to be concurrently manipulated by a plurality of graphic input devices.

The TCursorController class 440 is the server side interface to cursors and are preferably contained in the cursor server 450 which also provides an interface to an interrupt service routine (ISR, not illustrated) from a particular graphic input device. A cursor server 450 translates these requests into an appropriate method call in the corresponding TCursorController 440. Other similar calls may originate in an access manager (not shown) associated with the graphic input device.

Objects in the TCursorController subclass 440 are preferably created by a TCompositingLayer class 480 which thus allows for ordering and reordering of the cursors in dependence on the number of cursors required, their relative priority, as created, and any change in priority which may be desired in dependence on a particular manipulation being performed (e.g. to substitute sprites and change priority levels to prevent the cursor from being obscured by or obscuring important features of other objects, such as targets). It is also preferred that a default constructor be provided to allow a cursor to be placed underneath all other compositing layers.

The graphic associated with a cursor is cooperatively determined by the graphic input device, the current tool, the view trader the cursor and the active application. Further, different views may have different ways of specifying the cursor graphic such as by detection and signaling of coincidence of cursor location and a particular area of the display. As can be readily understood, this can lead to many independent reasons and orthogonal bases for subclassing of methods for choice of sprite or cursor graphic. This is complicated by the possibility of animation, and displays for cursor functionality, such as in three-dimensional simulation, or other extended cursor capabilities. Therefore, as a perfecting feature of a preferred embodiment, it is better to encapsulate the cursor graphic choices with a class 460 of TCursorPolicy objects which specify the graphic of any cursor entering a given area of the display, thus providing an indirect control of the graphic by an application 410. Further subclasses from the base TCursorPolicy class can then be provided for handling of any complex negotiation or arbitration of cursor display graphic.

Figure 5:
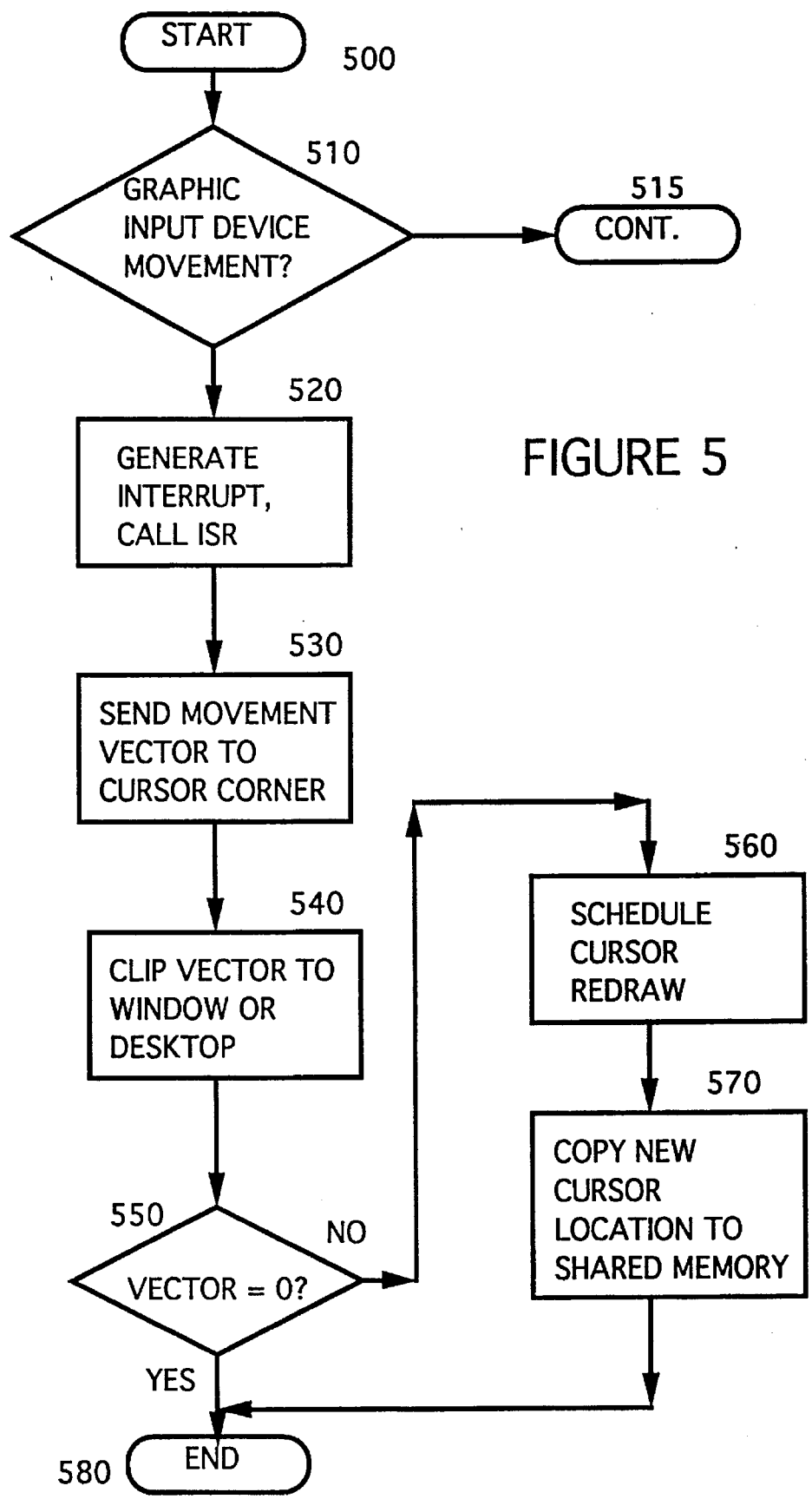
FIG. 5 is a flow chart illustrating the operation in accordance with a preferred embodiment.

Referring now to FIG. 5, the operation of the preferred embodiment of the invention will now be discussed. The process of updating displayed cursor location can be initiated in response to polling of graphic input devices, as indicated at 500, or asynchronously started upon movement of a graphic input device, as indicated at 510. If there is no movement of any particular graphic input device, processing continues (515) without changing displayed cursor location. If movement is detected, an interrupt is generated and an interrupt service routine (ISR) is called, as indicated in function block 520.

The details of the interrupt service routine are unimportant to the practice of the invention and basically serve to obtain the new cursor coordinates. In a preferred embodiment, the ISR retrieves the amount and direction of cursor movement from the graphic input device hardware and accumulates a delta amount which depends on the actual movement and the elapsed time between interrupts and subjected to a smoothing function. This allows for "acceleration" wherein rapid movements result in larger cursor displacements. This accumulated delta is sent (530) periodically as a movement vector to a cursor server. Such transmission generally requires an inter-process call (IPC) and, due to the time required for communication between processes, may be limited to a rate less than the rate of interrupts. The rate need not be higher than the frame refresh rate of the display device.

The cursor server receives the movement vector and clips it (540) against the display screen or any window or desktop limitation on movement of that particular cursor. If the clipped movement vector is then zero as detected at 550, no change in position of the cursor is permitted (to avoid the cursor being obscured or moved to a non-functional position) and the process ends at 580.

Figure 6:
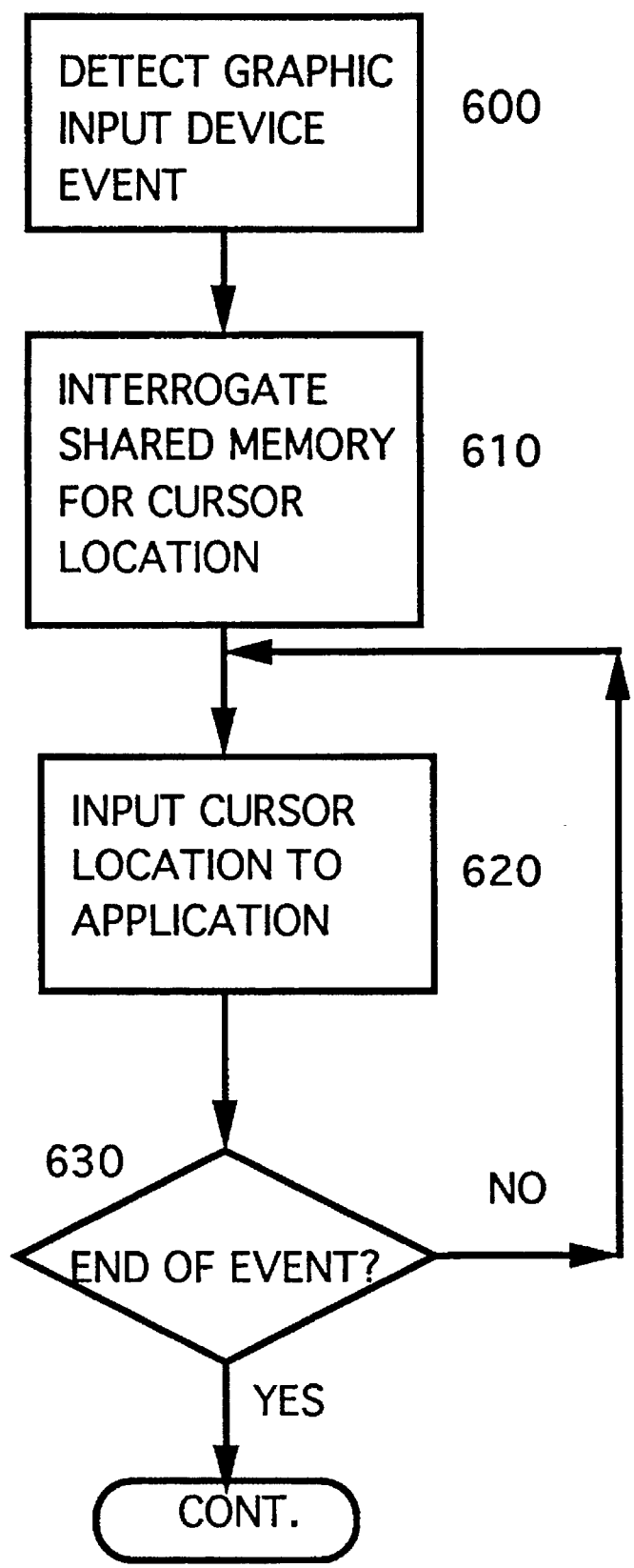
FIG. 6 is a flow chart illustrating response to a graphic input device "event" in accordance with a preferred embodiment.

If, however, the clipped movement vector is non-zero, a redraw of the cursor is scheduled (560) and, when completed, the new cursor location is copied to a location in shared memory at function block 570. Therefore, a cursor location will always be present in the shared memory from which it may be retrieved at any time and asynchronously in response to an "event", as shown at 600 and 610 of FIG. 6. The location which is retrieved and input to the application at 620 will always correspond to the last displayed location of the cursor and overshoot of the graphic input device is thus hidden from, the user at the instant of selection and continuing to the termination of the "event" (such as in dragging or rubberbanding), as detected at 630.

From the foregoing, it is seen that a cursor management system has been provided which improves the user interface, avoiding inaccurate selection and control of the system due to time lags between the specification of a changed cursor location and the time when the cursor actually appears at that location. The cursor management system also allows improved speed of user interaction since any increased delay is more likely to occur at a potentially correct selection location and which can be selected even before the cursor is rendered at another location specified by a graphic input device, even if overshoot has occurred. The cursor management system is fully compatible with multiple cursors within an application and multi-tasking environments.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for controlling display of a graphic cursor in a computer system having a computer, including an attached display and an attached storage containing an object-oriented operating system with a cursor control framework having information defining a cursor, said cursor's location, and said cursor's appearance on said display, said method comprising the steps of:

(a) creating a first object in said cursor control framework of said object-oriented operating system, said first object containing data defining said cursor's location and appearance on said display;

(b) creating a second object in said cursor control framework of said object-oriented operating system, said second object containing logic responsive to said appearance and location data contained in said first object for generating image data for displaying said cursor on said display; and (c) creating a third object in said cursor control framework, said third object containing address data indicating a location of said cursor and logic responsive to a generation of image data by said second object for adjusting said address data to indicate a last displayed location of said cursor.

2. A method as recited in claim 1, wherein step (a) comprises the step of creating said first object with logic for detecting a signal representing a user generated event, and with logic for retrieving said cursor's location information from said storage in response to said user generated event.

3. A method as recited in claim 2 wherein said data contained in said first object comprises a plurality of graphic images and step (a) comprises the step of selecting one of said plurality of graphic images for said cursor's appearance to adjust said cursor's appearance on said display.

4. A method as recited in claim 1, including the step of simultaneously controlling a plurality of cursors.

5. A cursor manipulation system, including:

(a) a computer;

(b) storage in said computer;

(c) a display attached to and controlled by said computer;

(d) an object-oriented operating system resident on said computer;

(e) cursor control framework resident in said storage and under the control of said computer said cursor control framework containing a cursor, said cursor's location, and said cursor's appearance on said display;

(f) means for creating a first object in said cursor control framework of said object-oriented operating system, said first object containing data defining said cursor's location and appearance on said display;

(g) means for creating a second object in said cursor control framework of said object-oriented operating system, said second object containing logic responsive to said appearance and location data contained in said first object for generating image data for displaying said cursor on said display; and (h) means for creating a third object in said cursor control framework said third object containing address data indicating a location of said cursor and logic responsive to a generation of image data by said second object for adjusting said address data to indicate a last displayed location of said cursor.

6. A system as recited in claim 5, wherein the first object comprises means for detecting a signal representing a user-generated event, and means for retrieving said cursor's location from said storage in response to said user generated event.

7. A system as recited in claim 6, wherein said first object comprises a plurality of graphic images and means for selecting one of said plurality of graphic images for said cursor's appearance to adjust said cursor's appearance on said display.

8. A system as recited in claim 6, including means for providing a plurality of cursors on said display.

9. A system as recited in claim 8, including means for specifying an order of said plurality of cursors.

10. A system as recited in claim 9, wherein the means for specifying an order of said cursors includes means for altering the ordering of the cursors.

* * * * *